United States Patent
Aggarwal et al.

(10) Patent No.: US 6,263,327 B1
(45) Date of Patent: Jul. 17, 2001

(54) FINDING COLLECTIVE BASKETS AND INFERENCE RULES FOR INTERNET MINING

(75) Inventors: Charu Chandra Aggarwal, Ossining; Philip Shi-Lung Yu, Chappaqua, both of NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/522,723

(22) Filed: Mar. 10, 2000

Related U.S. Application Data

(62) Division of application No. 08/975,603, filed on Nov. 21, 1997, now Pat. No. 6,094,645.

(51) Int. Cl.[7] .................................................. G06F 17/00
(52) U.S. Cl. .............................. 706/47; 706/48; 707/208
(58) Field of Search ........................... 706/47, 48; 707/1, 707/3, 6, 7, 100, 200

(56) References Cited

U.S. PATENT DOCUMENTS

| | | | | |
|---|---|---|---|---|
| 5,809,499 | * | 7/2000 | Wong et al. ............................ | 707/6 |
| 5,842,200 | * | 11/1998 | Agrawal et al. ........................ | 707/1 |
| 5,943,667 | * | 8/1999 | Aggarwal et al. ...................... | 707/3 |
| 5,946,683 | * | 8/1999 | Rastogi et al. ......................... | 707/6 |
| 5,983,222 | * | 11/1999 | Morimoto et al. ...................... | 707/6 |
| 6,003,029 | * | 7/2000 | Agrawal et al. ........................ | 707/7 |
| 6,094,645 | * | 7/2000 | Aggarwal et al. ..................... | 706/47 |
| 6,138,117 | * | 10/2000 | Bayardo ................................. | 707/6 |
| 6,173,280 | * | 1/2001 | Ramkumar et al. .................... | 707/6 |

OTHER PUBLICATIONS

Shintani et al, "Parallel mining algorthims for generalized association rules with classification hierarchy", ACM SIGMOD pp. 25–36, May 1998.*
Fortin et al., "An object oriented approach to multilevel association rule mining", ACM CIKM pp. 65–72, Aug. 1996.*
Park et al, "An effective hash based algorithm for mining association rules", ACM SIGMOD pp. 175–186, Jun. 1995.*
Park et al, "Efficient parallel data mining for association rules", ACM CIKM pp. 31–36, May 1998.*

* cited by examiner

*Primary Examiner*—Mark R. Powell
*Assistant Examiner*—Anil Khatri
(74) *Attorney, Agent, or Firm*—Scully, Scott, Murphy & Presser; David M. Shofi, Esq.

(57) ABSTRACT

A computerized method of online mining of inference rules in a large database. The method is comprised of two stages, a preprocessing stage followed by an online rule generation stage. The pro-processing stage is further defined to be a two step process that involves the generation of large itemsets. The present method defines large itemsets by how the items in the itemsets relate to each other rather than their level of presence. The measure by which itemsets are said to relate to each other is defined by a computed figure of merit, K1. The first substep of the preprocessing stage involves finding those itemsets that possess a minimum computer collective strength of K1. From those found itemsets, a second user supplied input, K2 is used to prune those itemsets with inference strength below K2.

27 Claims, 6 Drawing Sheets

FINDING COLLECTIVE BASKETS AND INFERENCE RULES FOR INTERNET MINING

This appln is a Div. of Ser. No. 08/975,603 filed Nov. 21, 1997, now U.S. Pat. No. 6,094,645.

BACKGROUND OF THE INVENTION

1. Field of the Invention

The present invention relates generally to online searching for data dependencies in large databases and more particularly to an online method of data mining.

2. Discussion of the Prior Art

Data mining, also known as knowledge discovery in databases, has been recognized as an important new area for database research with broad applications. With the recent popularity of the internet the internet rule mining problem is significant because of its ability to gain access to large databases over the Internet. The ability to gain access to such large databases without significant access delay is a primary goal of an on-line data miner.

In general, data mining is a process of nontrivial extraction of implicit, previously unknown and potentially useful information from data in databases. The discovered knowledge can be applied to information management, query processing, decision making, process control, and many other applications. Furthermore, several emerging applications in information providing services, such as on-line services and the World Wide Web, also call for various data mining techniques to better understand user behavior, to meliorate the service provided, and to increase the business opportunities. Since it is difficult to predict what exactly could be discovered from a database, a high-level data mining query should be treated as a probe which may disclose some interesting traces for further exploration. Interactive discovery should be encouraged, which allows a user to interactively refine a data mining request for multiple purposes including the following; dynamically changing data focusing, flexibly viewing the data and data mining results at multiple abstraction levels and from different angles.

A data mining system can be classified according to the kinds of databases on which the data mining is performed. In general, a data miner can be classified according to its mining of knowledge from the following different kinds of databases: relational databases, transaction databases, object-oriented databases, deductive databases, spatial databases temporal databases, multimedia databases, heterogeneous databases, active databases, legacy databases, and the Internet information-base. In addition to the variety of databases available, several typical kinds of knowledge can be discovered by data miners, including association rules, characteristic rules, classification rules, discriminant rules, clustering, evolution, and deviation analysis. Moreover data miners can also be categorized according to the underlying data mining techniques. For example, it can be categorized according to the driven method into autonomous knowledge miner, data-driven miner, query-driven miner, and interactive data miner. It can also be categorized according to its underlying data mining approach into generalization based mining, pattern based mining, mining based on statistics or mathematical theories, and integrated approaches, etc.

Given a database of sales transactions, it is desirable to discover the important associations among items such that the presence of some items in a transaction will imply the presence of other items in the same transaction. A mathematical model was proposed in Agrawal R., Imielinski T., and Swami A. Mining association rules between sets of items in very large databases, Proceedings of the ACM SIGMOD Conference on Management of data, pages 207–216, Washington D.C., May 1993, to address the problem of mining association rules.

Let $U=\{i1, i2, \ldots, im\}$ be a set of literals called items. Let D be a set of transactions; where each individual transaction T consists of a set of items, such that T is a subset of U. Note that the actual quantities of items bought in a transaction are not considered, meaning that each item is a binary (0 or 1) variable representing if an item was bought. Let U be a set of items. A transaction T is said to contain the set of items U if and only if U is a subset of T.

An association rule is an implication or query of the form $X==>Y$, where both X and Y are sets of items. The idea of an association rule is to develop a systematic method by which a user can figure out how to infer the presence of some sets of items, such as Y, given the presence of other items in a transaction, such as X. Such information is useful in making decisions such as customer targeting, shelving, and sales promotions.

The Rule $X==>Y$ holds in the transaction set D with confidence c if c% of transactions in D that contain X also contain Y. For example, a rule has 90% confidence when 90% of the tuples containing X also contain Y. The rule has support s if s% of transactions in D contain (X union Y).

It is often desirable to pay attention to only those rules which may have reasonably large support. Such rules with high confidence and high support are referred to as association rules. These concepts were first introduced into the prior art, see Agrawal et al, infra. The task of mining association rules is essentially to discover strong association rules in large databases. The notions of confidence and support become very useful in formalizing the problem in a computational efficient approach called the large itemset method. The large itemset approach can be decomposed into the following two steps:

1) Discover the large item sets, i.e., the sets of item sets that have transaction support above a predetermined user defined minimum support, called minsupport.

2) Use the large item sets to generate the association rules for the database that have confidence above a predetermined user defined minimum confidence called minconfidence.

Given an itemset $S=\{I1, I2, \ldots, Ik\}$, we can use it to generate at most k rules of the type $[S-\{Ir\}]==>Ir$ for each r in $\{1, \ldots, k\}$. Once these rules have been generated, only those rules above a certain user defined threshold called minconfidence are retained.

The overall computational complexity of mining association rules is determined by the first step. After the large itemsets are identified, the corresponding association rules can be derived in a straightforward manner. Efficient counting of large itemsets was the focus of most prior work. Nevertheless, there are certain inherent difficulties with the use of these parameters in order to establish the strength of an association rule.

After the fundamental paper on the itemset methods see Agrawal et al. infra, a considerable amount of additional work was done based upon this approach; For example, faster algorithms for mining association rules were proposed in Aarawal R., and Srikant R. Fast Algorithms for Mining Association Rules in Large Databases. Proceedings of the 20th International Conference on Very Large Data Bases, pages 478–499, Sep. 1994.

A secondary measure called the interest measure was introduced in Agrawal et. al. in Srikant R., and Aarawal R.

Mining quantitative association rules in large relational tables. Proceedings of the 1996 ACM SIGMOD Conference on Management of Data. Montreal, Canada, June 1996. A rule is defined to be R-interesting, if its actual support and confidence is R-times that of the expected support and confidence. It is important to note here that the algorithms previously proposed for using the interest measure are such that the support level remained the most critical aspect in the discoverability of a rule, irrespective of whether or not an interest measure was used.

One of the difficulties of the itemset method is its inability to deal with dense data sets. Conversely, the success of the itemset approach relies on the sparsity of the data set. For example, if the probability of buying soup were around 2%, such occurrence would be considered to be statistically sparse and therefore amenable to an itemset approach. This is because for a k-dimensional database, a database with k purchasable items, there are 2^k possibilities for itemsets. The sparsity of the dataset ensures that the bottleneck operation (which is the generation of large itemsets) is not too expensive, because only a few of those 2^k itemsets are really large. However, some data sets may be more dense than others, and in such cases it may be necessary to set the minsupport s, to an unacceptably high level, in which case a lot of important rules would be lost. The issue of dense data sets becomes even more relevant when we attempt to mine association rules based upon both the presence or absence of an item. Although the itemset approach can be extended to the situation involving both presence as well as the absence of items (by treating the absence of an item as a pseudo-item), the sparsity of item presence in real transaction data may result in considerable bias towards rules which are concerned only with finding rules corresponding to absence of items rather than their presence.

Another drawback of the itemset approach with respect to dense data sets occurs when trying to mine large itemsets corresponding to [0–1] categorical data mixed with sales transaction data. For example, while trying to find the demographic nature of people buying certain items, the problem of determining an appropriate support level may often arise.

Another potential problem in the itemset approach is the lack of direct applicability of support and confidence to association rule mining. In the itemset approach, the primary factor used in generating the rules is that of support and confidence. This often leads to misleading associations. An example is a retailer of breakfast cereal which surveys 5000 students on the activities they participate in each morning. The data shows that 3000 students play basketball, 3750 eat cereal, and 2000 students both play basketball and eat cereal. If the user develops a data mining program with minimal support, s=40%=2000/5000, and minimal confidence c=60%, the following association rule is generated:

Association Rule Generated play basketball==>eat cereal

The association rule is misleading because the overall percentage of students eating cereal is 75% 3750/5000, which is even larger than 60%. Thus, although playing basketball and eating cereals are negatively associated, being involved in one decreases the chances of being involved in the other. In fact, if we consider the following association rule:

play basketball==>(not) eat cereal

This rule has both lower support as well as lower confidence than the rule implying positive association, yet it is far more accurate. Thus, if we set the support and confidence sufficiently low, the two contradictory rules described above would be generated. On the other hand, if we set the parameters sufficiently high, the undesirable consequence of generating only the inaccurate rule would occur. In other words, no combination of user defined support and confidence can generate only the correct association.

The use of an interest measure somewhat alleviates the problem created by the spurious association rules in a transaction database. Past work has primarily concentrated on using the interest measure as a pruning tool in order to remove the uninteresting rules in the output. However, as the basketball-cereal example illustrates, as long as an absolute value of support is still the primary determining factor in the initial itemset generation, either the user has to set the initial parameter low enough so as no interesting rules are lost in the output or risk losing some important rules. In the former case, computational efficiency and computer memory may be a problem, while the latter case has the problem of not being able to retain rules which may be interesting from the point of view of a user. In either case, it is almost impossible to ascertain when interesting rules are being lost and when they are not.

SUMMARY OF THE INVENTION

The object of the present invention is directed to a method for utilizing on-line mining to find collective baskets and generating inference rules from these baskets.

It is a further object of the invention to redefine large itemsets such that on-line mining of collective basket data improves the quality of the generated itemsets.

The object of the present invention is achieved in two general stages, a preprocessing stage followed by an online rule generation stage. The preprocessing stage further includes three sub-stages where the final result is the generation of high quality itemsets, referred to as collective baskets, which are then provided as input to the second general stage, inference rule generation. Collective baskets can generally be defined as itemsets where each item is represented by a single parameter indicating its presence or absence [0,1]. The substeps of the preprocessing stage generally involve discarding collective baskets which do not satisfy certain user defined threshold criteria. The substeps of the preprocessing stage are more particularly defined as follows; collective baskets are first generated from the set of transaction data provided as raw input to the pre-processing stage. A collective strength figure, K1, is computed for each collective basket. The collective strength represents a real number between zero and infinity. It is a measure of correlation between the different items in the collective basket (itemset). A value of zero indicates perfect negative correlation, while a value of infinity indicates perfect positive correlation between the items in the collective basket. Each baskets computed collective strength value is measured against an online user supplied value of collective strength and only those baskets whose K1 value is at least equal to the user supplied value will be retained. At the next substep of the preprocessing stage an inference strength figure, K2, will be calculated for those baskets retained from the previous step. The inference strength is computed as a function of the fraction of items in an itemset. This represents the amount by which the strength of the rule exceeds the expected strength based upon the assumption of statistical independence. An inference rule of 1 indicates that the inference rule is "at strength". This refers to the fact that the correlation between antecedent and consequent is neither specially positive nor negative. A comparison will be made of the basket's computed inference strength against a user supplied value of inference strength. Only those collective baskets will be retained which possess a calculated inference strength, K2, at least equal to the user supplied value. For those collective baskets that were retained from the previous substeps, a third and final substep of the preprocessing stage occurs, defined as a pruning step. The pruning step effectively removes all those formerly retained baskets which do not convey enough information in order to be statistically significant. Collective baskets are pruned when their calculated minsupport is below a level of minsupport specified an online user as input. The second stage, online rule generation utilizes those baskets which Subsequent to the pruning step, inference rules are generated from those remaining collective baskets whose associated values of K1, K2, and minsupport are at least equal to that specified by an online user.

DESCRIPTION OF THE PREFERRED EMBODIMENTS

Figure 1:
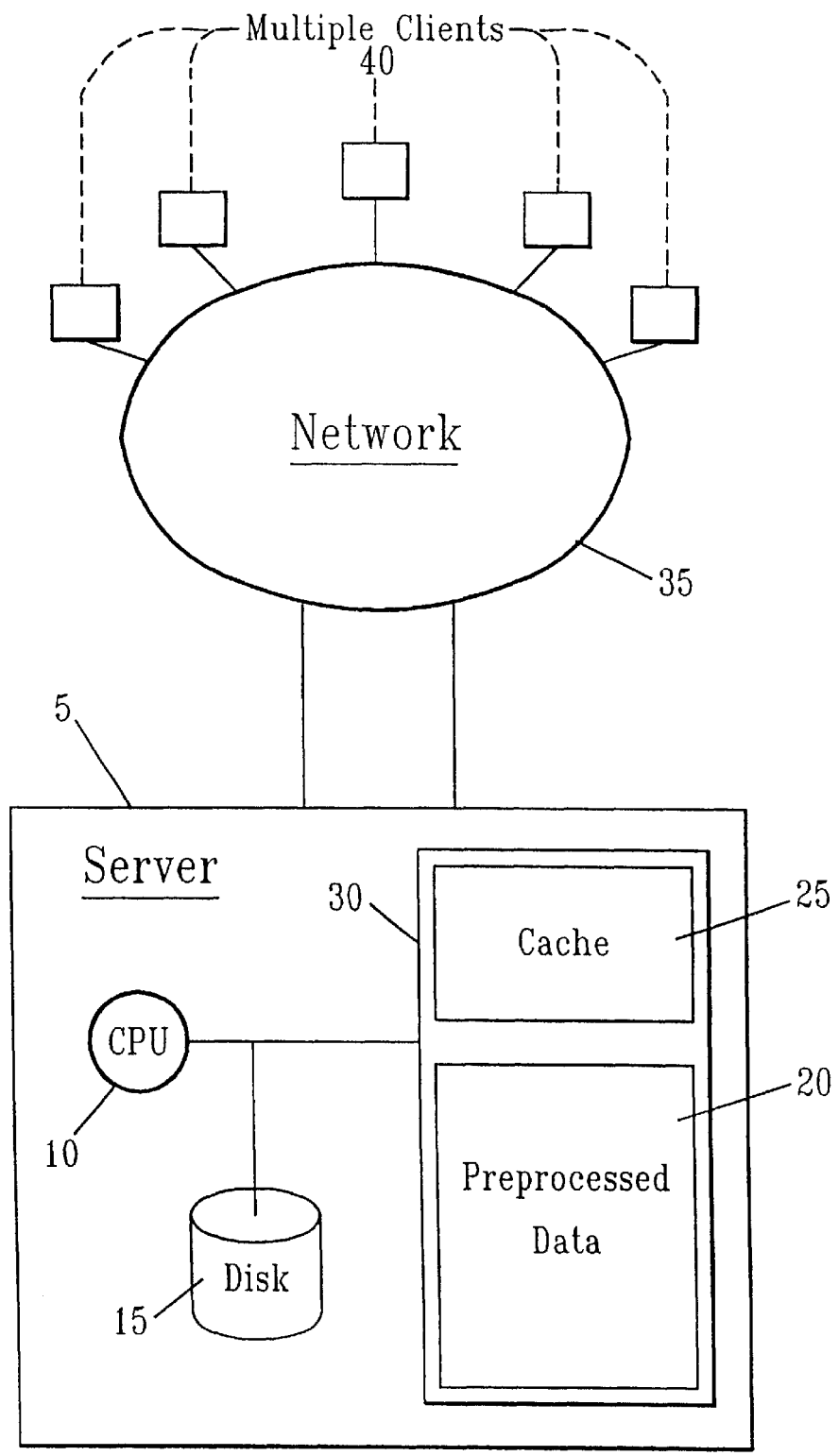
FIG. 1 depicts an example of a computer network in which this invention can operate.

FIG. 1 depicts an example of a computer network applicable to the present invention. There are assumed to be multiple clients 40 which can access the preprocessed data over the network 35. The preprocessed data resides at the web server 5. There may be a cache 25 at the server end, along with the preprocessed data 20. The preprocessing as well as the online processing takes place in the CPU 10. In addition, a disk 15 is present in the event that the data is stored on disk.

Figure 2:
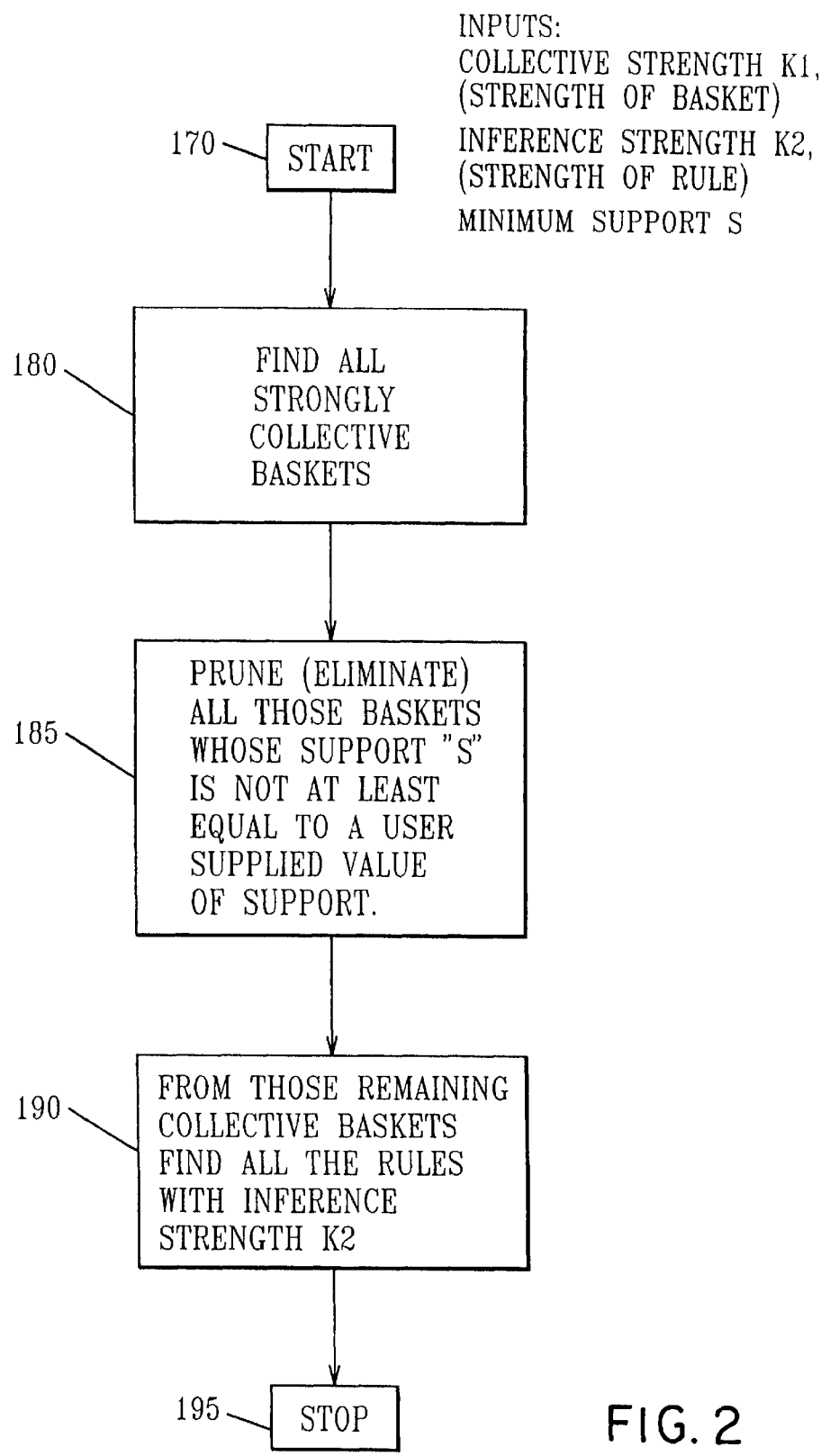
FIG. 2 depicts an example of a method performed by the invention.

FIG. 2 depicts an example of a method having features of the present invention. Step 170 describes the three inputs required of the present method. These three inputs are (1) a query (implication), in the form of an antecedent/consequent pair, (2) an expected value of support, minsupport s, (3) a value for collective strength, K1, (4) a value of inference strength, K2.

Step 180 defines stage 1 of the present method, in stage 1 all strongly collective baskets are found which satisfy the user specified input of collective strength, K1. Utilizing those collective baskets from stage 1, Step 185 defines the second stage where all collective baskets discovered from stage 1 are discarded whose minimum support does not satisfy the user specified input s, minsupport. From those remaining collective baskets, Step 190 defines the third and final stage of the method which involves generating inference rules from those remaining collective baskets whose inference strength is equal to or greater than the user specified input, K2.

Figure 3:
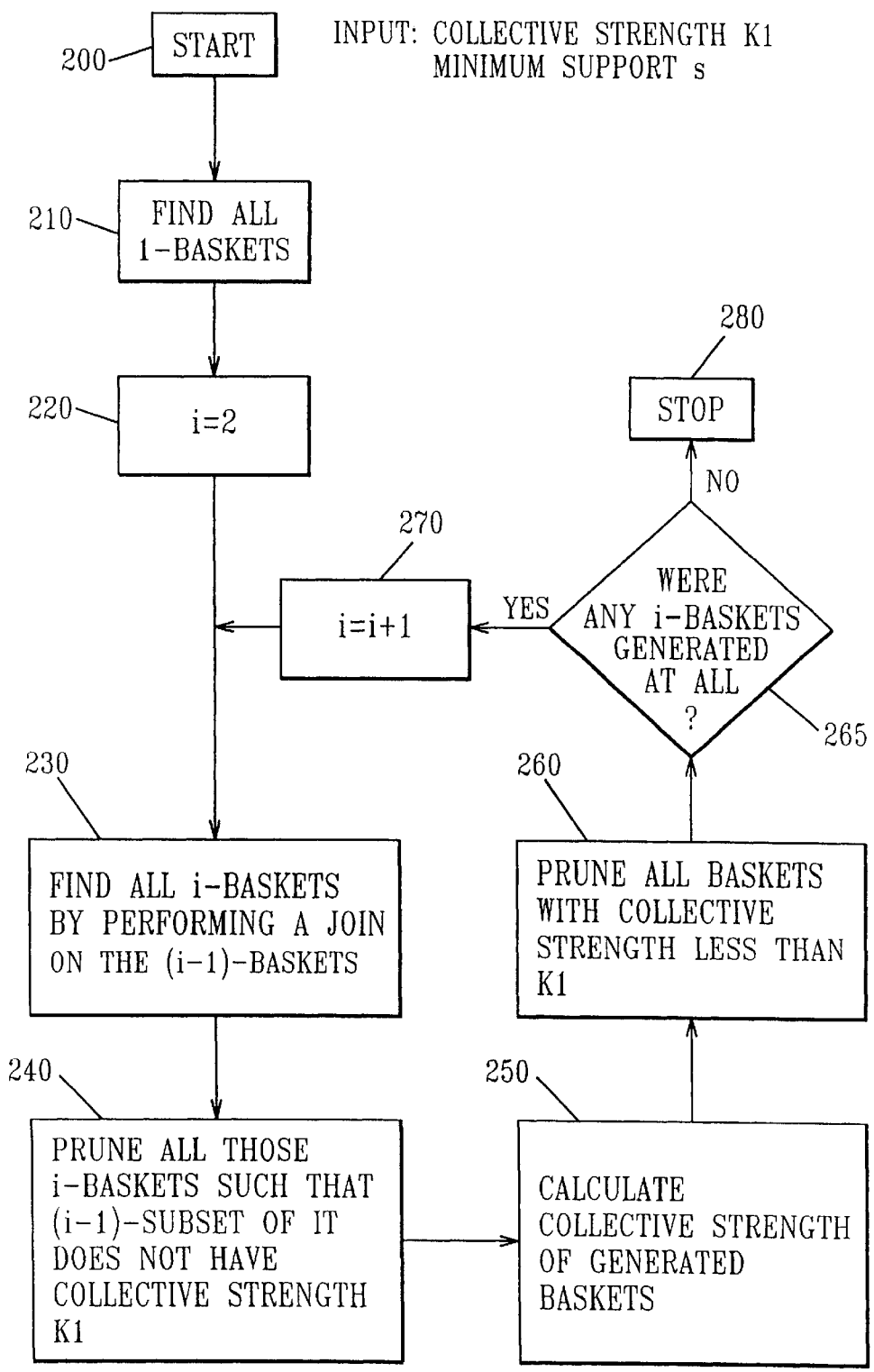
FIG. 3 depicts an example of a more detailed method of how all the collective baskets can be found. It can be considered an expansion of step 180 of FIG. 1.

FIG. 3 depicts an example of a flowchart of stage 1 of the present method where all collective baskets are found whose collective strength at least equals a user supplied value of collective strength, K1. The algorithm of FIG. 3 can be considered as an example of Step 180 of FIG. 2. The process steps involve first collecting all collective baskets with a single item, 1-baskets. Such baskets are strongly collective by definition. This procedure is defined by Step 210. Note that this step is radically different from the large itemset approach, where the large 1-itemsets are not the set of exhaustive 1-items. The algorithm then increments a counter I from 2 to N, where N represents those transactions containing the largest number of items in the database to find all strongly collective I-baskets from the set of strongly collective (I−1) baskets from the previous iteration. Step 220 initializes the counter to a value of 2 to find all strongly collective 2-baskets from the set of strongly collective 1-baskets. Step 230 represents the software to when a I-basket is considered to be strongly collective. I-baskets are created by performing a join (union) operation on the (I−1) baskets when a prespecified criteria is met. The criteria for joining two (I−1) baskets is that they have at least (I−2) items in common. For example, assume two representative (I−1) baskets were found to be;

(Milk, bread)

(Bread, butter)

then the join operation, defined at Step 230, would yield a single I-basket in this case, where I=3;

(Milk, bread, butter) 3-basket

After generating all of the I-baskets from the (I−1)-baskets which satisfy the prespecified criteria, Step 240 represents the software to implement the process step of pruning those I-baskets. Pruning a basket in the present method implies that the basket will no longer be under consideration for the purposes of the algorithm. An I-basket is pruned when at least one (I−1) subset of that I-basket does not have a collective strength at least equal to K1. Using the example above, the (I−1) subsets of the 3-basket, (Milk, bread, butter) would be;

I−1 Subsets of (Milk, Bread, Butter)

(Milk, bread)

(Bread, butter)

(Milk, butter)

If at least one of the three I−1 subsets above does not have collective strength at least equal to K1, the 3-basket from which it was generated, (Milk, bread, butter) will be pruned. Step 240 represents the pruning step. Of the remaining I-baskets which have not been pruned, Step 250 represents the software to implement the process step of calculating the collective strength of those remaining I-baskets. An example of process steps for calculating the collective strength will be described in FIG. 4. Step 260 then represents the step of pruning those remaining I-baskets with collective strength less than K1. Step 265 represents the decision step determine whether there was at least one I-basket output from Step 260 whose collective strength was at least equal to K1. If there were no I-baskets which satisfy decision step 265 then the procedure for finding strongly collective baskets terminates at Step 286. Otherwise, the counter is incremented and process steps 230–270 repeat.

Figure 4:
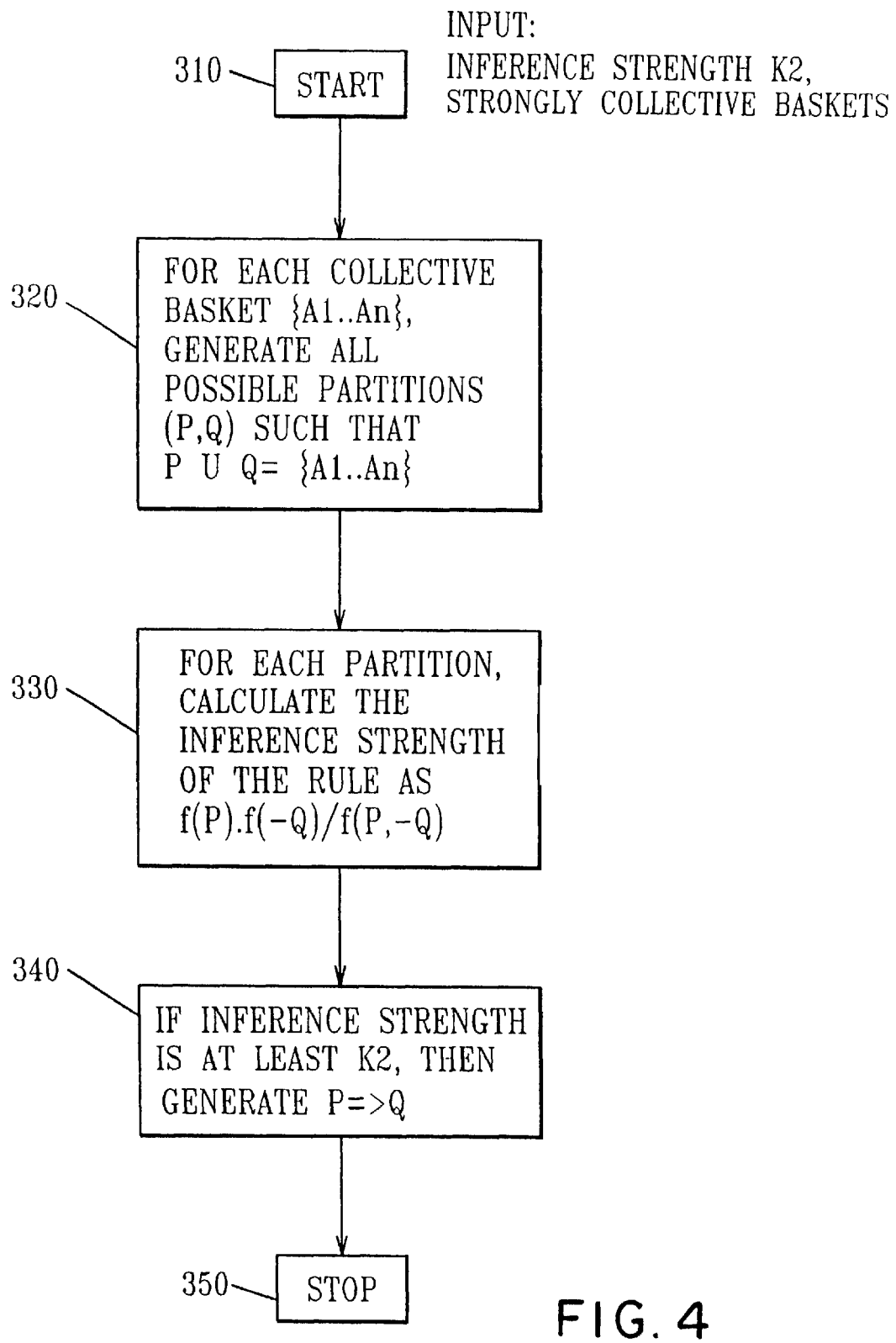
FIG. 4 depicts an example of a more detailed method of how the inference rules can be mined from the collective baskets. It can be considered an expansion of step 190 of FIG. 1.

FIG. 4 depicts an example of a method for generating (mining) inference rules from the strongly collective baskets described in FIG. 3. The diagram in FIG. 3 shows how the inference rules may be mined from the strongly collective baskets. Step 310 is the entry into the algorithm. Two inputs are required, the Inference Strength K2 and the set of strongly collective baskets output from the previous stage of the algorithm. In order to generate the inference rules, each strongly collective basket {A1, A2, . . . An} is partitioned into all of its possible partition, P and Q such that $$(P \text{ union } Q) = \{A1, A2, \ldots An\} \quad [Eq.1]$$

Step 320 represents the software to implement the process step of generating all possible partitions which satisfy Eq. 1. For example, assume that seven strongly collective baskets were generated from the previous stage of the algorithm as;

1. {A1}
2. {A2}
3. {A3}
4. {A4}
5. {A1,A3}
6. {A2,A4}
7. {A1,A3,A4}

Using collective basket #7 as a representative example, partition the basket into all of the possible partitions of (P,Q) yielding;

TABLE 1

Partitioning strongly collective basket #7

| | | | proposed rule |
|---|---|---|---|
| P = A1 | and | Q = A3, A4 | A1 = > A3, A4 |
| P = A3 | and | Q = A1, A4 | A3 = > A1, A4 |
| P = A4 | and | Q = A1, A3 | A4 = > A1, A3 |
| P = A1, A3 | and | Q = A4 | A1, A3 = > A4 |
| P = A1, A4 | and | Q = A3 | A1, A4 = > A3 |
| P = A3, A4 | and | Q = A1 | A3, A4 = > A1 |

For each partition generated in Table 1., determine whether the rule P==>Q is relevant by calculating the inference strength of the rule. Step 330 represents the software to implement the process steps of calculating the inference strength of the rule, P==>Q. The inference strength of the rule is defined as $$\text{Inference strength} = [f(P)*f(-Q)]/f(P,-Q) \quad [Eq.2]$$

Let f(P) represent the fraction of the transactions containing P, and let f(-Q) be the fraction of the transactions in which not all items in Q are contained in the transaction. Correspondingly, let f(P, -Q) be the fraction of the transactions which contain P but not all the items in Q. In step 340, a rule P==>Q will be generated if the inference strength calculation, defined by Eq. 2, is at least equal to a user supplied value of inference strength, K2. Calculated values of inference strength less than K2 will not generate an inference rule from the associated strongly collective basket. Step 350 represents the termination step.

Figure 5:
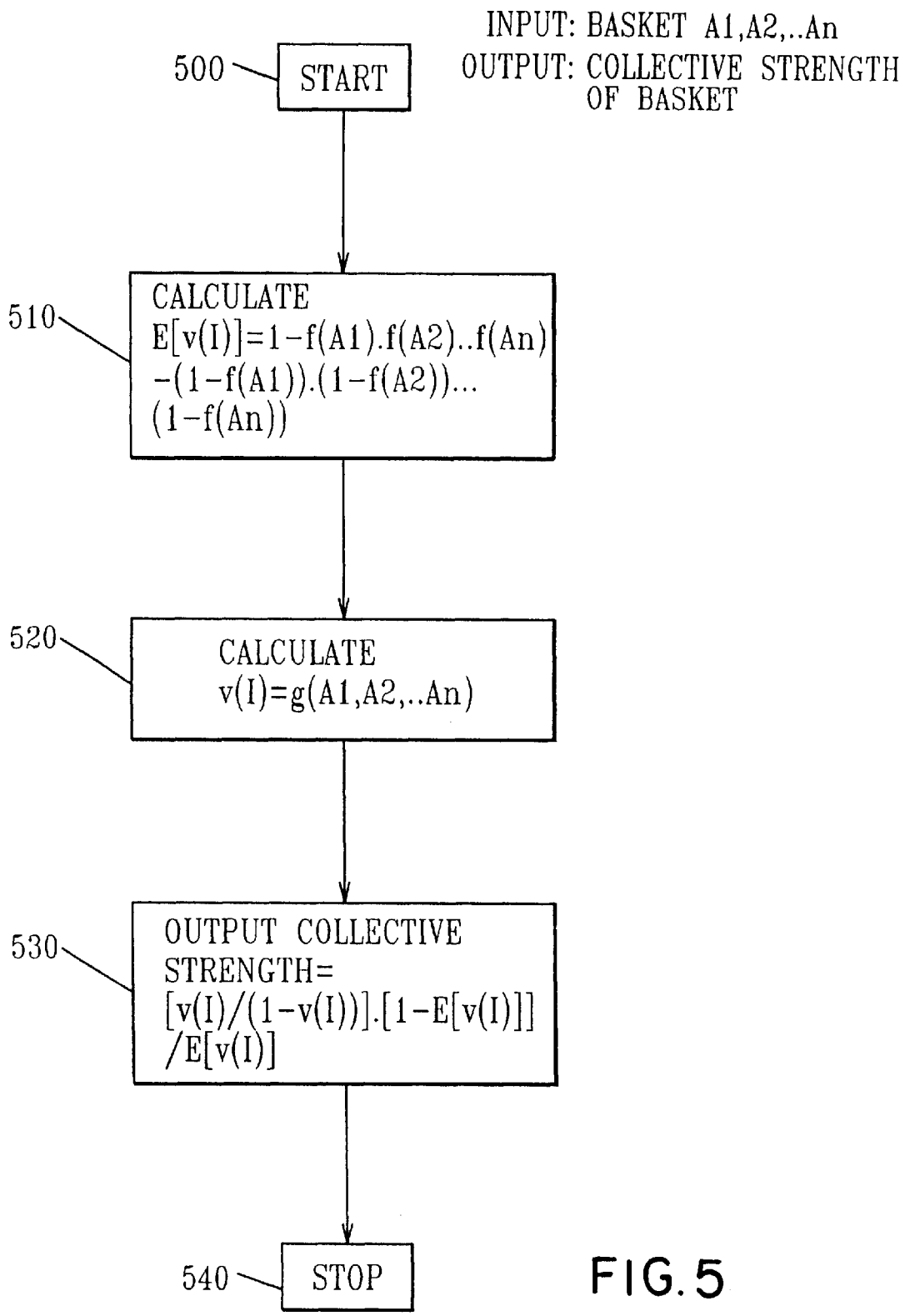
FIG. 5 depicts an example of a more detailed method of how the collective strength of the generated baskets are calculated. It can be considered an expansion of step 250 of FIG. 2.

FIG. 5 depicts an example of a method for calculating the collective strength of a basket. Step 500 is the input step to the process. Step 500 defines a single input, the collective basket {A1,A2 . . .An}. Computing the collective strength, K1, requires that both the violation measure, v(I), and the expected violation measure, E[v(I)], are computed as required inputs to the collective strength calculation. The collective strength is defined by Eq. 3 below as;

Collective Strength Equation $$[1-E[v(I)]/E[v(I)]][v(I)/(1-v(I))] \quad [Eq.3]$$

where
  v(I)=the violation measure
  E[v(I)]=the expected violation measure

Step 510 represents the software to implement the process step of calculating the Expected violation measure, E[v(I)]. The expected violation measure is computed as;

Expected Violation Equation $$E[v\{I\}] = 1 - f(A1)*f(A2)* \ldots f(An) - [1 - f(A1)][1 - f(A2)] \ldots [1 - f(An)] \quad Eq.4$$

The expected violation represents the expected fraction of transactions in which some but not all of the items in the collectively strong input basket, (A1, A2, . . .An), occur together. Note from Eq. 4 that this is a probabilistic determination. Let f(Ai) denote the fraction of the transactions in which the item Ai occurs.

Step 520 represents the software to implement the process step of calculating the violation measure, v(I). The violation measure, v(I), represents the fraction of transactions where there is at least tie missing item from the collectively strong input basket. For example, assume the collectively strong input basket is as follows;

Collectively Strong Input Basket={A1,A3,A5} the following table describes some typical transactions which do and do not violate the input;

TABLE II

Examples of violations and non-violations of the violation measure

| Transactions which violate the basket {A1, A3, A5} | Transactions which do not violate the basket {A1, A3, A5} |
|---|---|
| {A1, A2, A3, A4} missing A5 | {A1, A2, A3, A5, A6} all present |
| {A2, A3, A4, A5} missing A1 | {A1, A3, A4, A5, A8} all present |
| {A1, A5, A6} missing A3 | {A6, A8, A10} all absent |

The violation measure gives some indication of how many times a customer may buy at least some of the items in the itemset, but may not buy the rest of the items. The violation measure is calculated as a function of the actual fraction, N2, of transactions in which the items {A1, A2, . . . An} occur together.

Step 530 represents the software to implement the process step of calculating the collective strength, as defined by Eq. 3 above. Step 540 is the termination step in the process.

Figure 6:
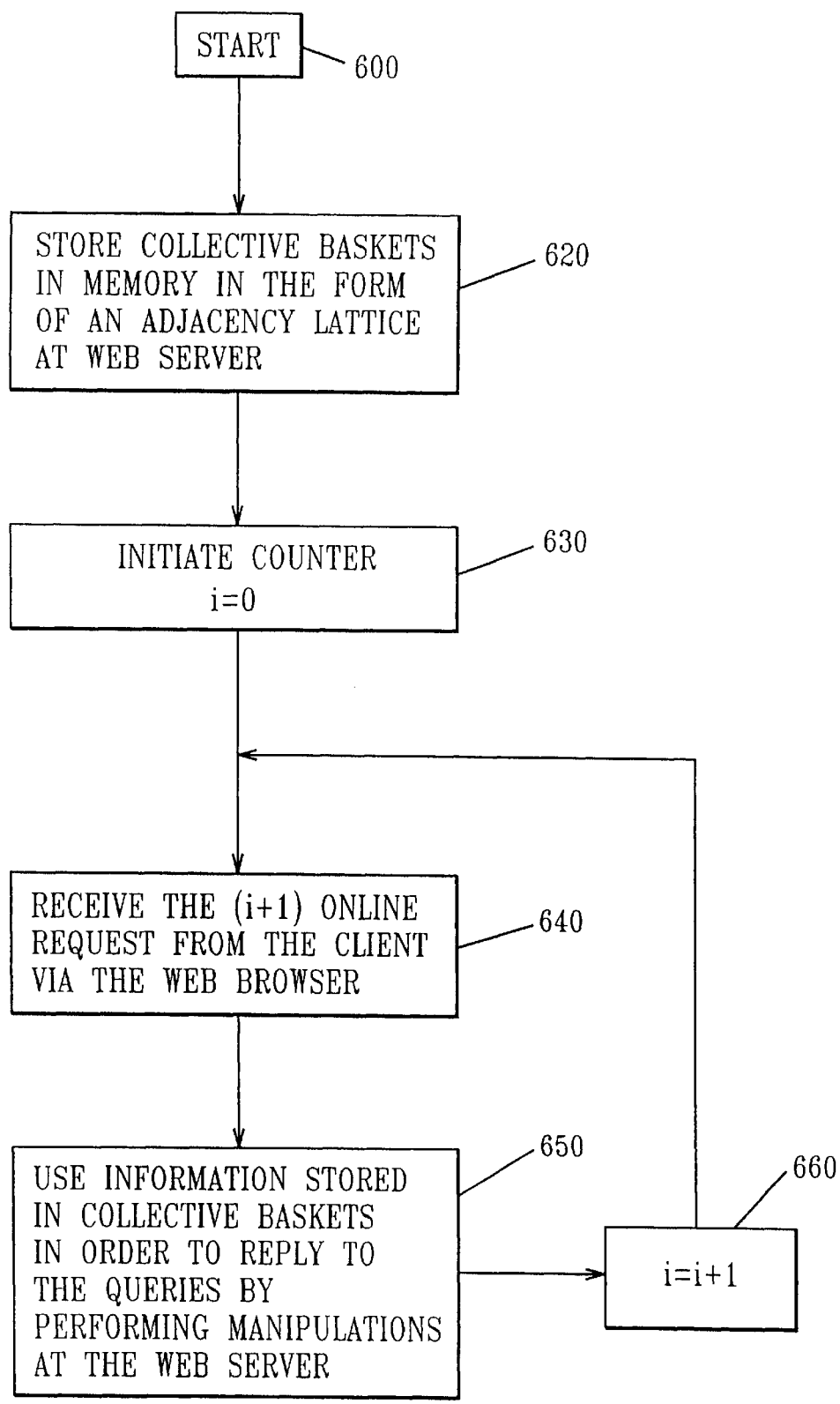
FIG. 6 depicts an example of a method for online mining having features of the present invention.

FIG. 6 depicts an example of a method for performing on-line mining of inference rules. Step 620 represents the software to implement the process step of storing the collectively strong baskets in the form of an adjacency lattice at the web server 5. The details of how the adjacency lattice is utilized is well known in the prior art and may be found in Aggarwal C. C. and Yu P. S. Online generation of association rules. IBM Research Report, RC-20899.

The process of storing the data into the adjacency lattice is considered to be a pre-processing step to the step of online mining of inference rules. Steps 630 through 650 define the on-line mining step. The general description of on-line mining, defined by steps 630–650 is that of using the information stored at the web server in the pre-processing step, Step 620, in order to reply to queries supplied by an on-line user. Step 630 defines a counter, initialized to zero, to indicate the number of requests received from an online user at the web server. The process of online mining essentially consists of a series of online requests, where individual requests are made in successive fashion by an online user to further refine a query. An iteration counter is incremented for each successive request beyond the initial request. The loop structure of FIG. 6 depicts this process. Step 640 represents the software to implement the process step of receiving an online request at the web server from a client. The request would consist of a query, in antecedent/consequent form, a value of collective strength, K1, and a value of inference strength, K2. Step 650 represents the software to implement the process step of replying to the online request by performing data manipulations at the web server on the adjacency lattice. The details of performing the data manipulation are illustrated in the prior art, See Aggrawal et al. Subsequent to responding to the user query the counter is incremented at Step 660 in anticipation of the next online request.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A computer program device readable by a machine, tangibly embodying a program of instructions executable by machine to perform method steps for generating inference rules that identify transaction patterns describing consumer transaction tendencies from transaction data stored in one or more databases, the method steps comprising:
   a) generating a plurality of strongly collective baskets whose collective strength is at least equal to a defined collective strength value, including the steps of
      i) generating collective baskets,
      ii) identifying a collective strength value for each collective basket, and
      iii) identifying the collective baskets having collective strength values greater than a given value; and
   b) generating inference rules for the identified collective baskets whose inference strength is greater than a defined inference strength value.

2. The computer program device of claim 1, wherein said collective
   strength is a function of a violation measure.

3. The computer program device of claim 2, wherein said violation measure is defined by the fraction of transactions which contain at least one item but not all items in said collective basket.

4. The computer program device of claim 2, wherein the collective strength is normalized using an expected violation measure.

5. The computer program device of claim 4, wherein the expected violation measure is a function of the level of presence of the individual items in that itemset.

6. The computer program device of claim 4, wherein said expected violation measure is defined as the fraction of transactions which are expected to violate the collective basket.

7. The computer program device of claim 1, further comprising the step of receiving input data including a user-defined value of minimum support.

8. The computer program device of claim 7, further comprising the step of pruning those collective baskets whose minimum support is less than said user-defined value of minimum support.

9. The computer program device of claim 1, wherein the step of generating a plurality of collective baskets further comprises generating all r-baskets with collective strength above said user defined value of collective strength, where said r-baskets are defined as collective baskets of item size r, until no (r+1)-basket can be generated with collective strength above said user defined value of collective strength.

10. The computer program device of claim 1, wherein the step of generating a plurality of collective baskets is a function of both said items presence and said items non-presence.

11. The computer program product of claim 1, further comprising the step of prestoring those collective baskets whose collective strength is at least equal to said user defined value of collective strength.

12. The computer program product of claim 1, further comprising the step of receiving input data including user-defined values of collective strength and inference strength.

13. The method of claim 1, further comprising the step of interactively generating inference rules on one of an intranet or Internet.

14. A computer program device according to claim 1, wherein the step of identifying the collective baskets includes the steps of
   for each of the generated collective baskets, comparing the collective strength value for the basket against the given value; and
   retaining only the collective baskets having collective strength values greater than the given value.

15. A computerized method for generating inference rules that identify transaction patterns describing consumer transaction tendencies from transaction data stored in one or more databases, the method steps comprising:
   a) generating a plurality of strongly collective baskets whose collective strength is at least equal to a defined collective strength value, including the steps of
      i) generating collective baskets,
      ii) identifying a collective strength value for each collective basket, and
      iii) identifying the collective baskets having collective strength values greater than a given value; and
   b) generating inference rules for the identified baskets whose inference strength is greater than a defined inference strength value.

16. The method of claim 15, wherein said collective strength is a function of a violation measure.

17. The method of claim 16, wherein said violation measure is defined by the fraction of transactions which contain at least one item but not all items in said collective basket.

18. The method of claim 16, wherein the collective strength is normalized using an expected violation measure.

19. The method of claim 18, wherein the expected violation measure is a function of the level of presence of the individual items in that itemset.

20. The method of claim 18, wherein said expected violation measure is defined as the fraction of transactions which are expected to violate the collective basket.

21. The method of claim 15, further comprising the step of receiving input data including a user-defined value of minimum support.

22. The method of claim 21, further comprising the step of pruning those collective baskets whose minimum support is less than said user-defined value of minimum support.

23. The method of claim 15, wherein the step of generating a plurality of collective baskets further comprises generating all r-baskets with collective strength above said user defined value of collective strength, where said r-baskets are defined as collective baskets of item size r, until no (r+1)-basket can be generated with collective strength above said user defined value of collective strength.

24. The method of claim 15, wherein the step of generating a plurality of collective baskets is a function of both said items presence and said items nonpresence.

25. The method of claim 15, further comprising the step of prestoring those collective baskets whose collective strength is at least equal to said user defined value of collective strength.

26. The method of claim 15, further comprising the step of receiving input data including user-defined values of collective strength and inference strength.

27. A method according to claim 15, wherein the step of identifying the collective baskets includes the steps of:

for each of the generated collective baskets, comparing the collective strength value for the basket against the given value; and retaining only the collective baskets having collective strength values greater than the given value.

* * * * *